Sept. 29, 1931.    N. J. NOLAN    1,824,787
ROLLER BEARING AND METHOD OF MAKING SAME
Filed March 2, 1931
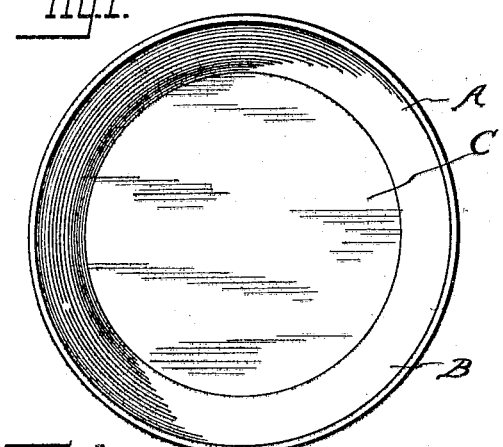
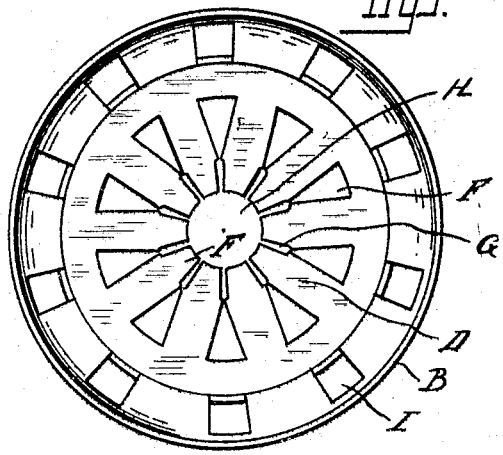
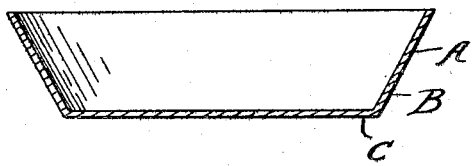
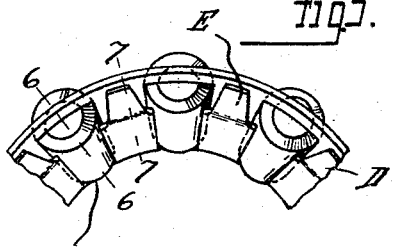
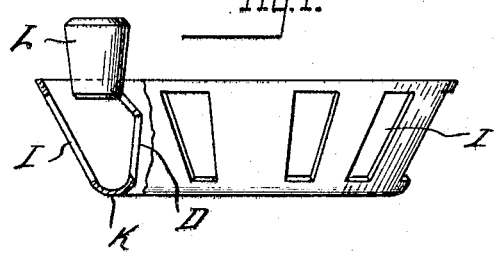
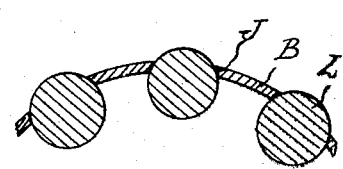
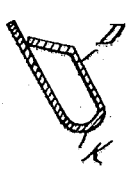
INVENTOR
Nicholas J. Nolan
BY Whittemore Hulbert
Whittemore & Belknap
ATTORNEYS Patented Sept. 29, 1931

1,824,787

UNITED STATES PATENT OFFICE

NICHOLAS J. NOLAN, OF DETROIT, MICHIGAN, ASSIGNOR TO ADVANCE STAMPING COMPANY, OF DETROIT, MICHIGAN, A CORPORATION OF MICHIGAN

ROLLER BEARING AND METHOD OF MAKING SAME

Application filed March 2, 1931. Serial No. 519,559.

The invention relates to roller bearings and more particularly to the construction of the cage with which the rolls are assembled. It is the object of the invention to obtain an exceedingly simple construction which can be easily manufactured at low cost, facilitates assembly and securely holds the rolls in the desired spaced relation. With these objects in view the invention consists in the construction and method of forming the same as hereinafter set forth.

In the drawings:

Figure 1 is a plan view and

Figure 2 is a central cross section through the cupped blank from which the cage is formed;

Figure 3 is a view similar to Figure 1 showing the blank after stamping of the same;

Figure 4 is a section similar to Figure 2 showing the blank stamped and formed ready for the reception of the rolls;

Figure 5 is an enlarged plan view of a portion of the cage with the rolls assembled therewith;

Figures 6 and 7 are cross sections on line 6—6 and line 7—7 of Figure 5.

Figure 8 is a cross section through the rolls in engagement with the apertured flange showing the edges of said apertures formed to be tangent to the surface of the rolls.

My improved bearing is of the type in which the rolls are arranged between conical race members and have their axes converging to a common point coincident with the imaginary apices of said conical race members.

The rolls may be either cylindrical or slightly tapered, the tapered form being preferable. It is the primary object of the invention to form a cage for retaining the rolls which can be fashioned from an integral sheet metal blank, the construction being as follows:

A is a cup shaped blank formed from pressed sheet metal having the conical annular flange B and an imperforate bottom C. This cup member is then punched to cut away portions of the bottom C, leaving the radially inwardly extending tongue portions D terminating in tapering end portions E. As shown in Figure 3, these tongues are formed by cutting out the triangular portions F and G intermediate adjacent tongues together with the center portion H. The annular flange B is also punched to form a series of apertures I of longitudinal length corresponding to the rolls and of a width slightly less than the diameter of the roll. The edges of the aperture are also pressed as indicated at J to be slightly upset and turned to an angle which will be tangent to the surface of the roll at the point of bearing thereon.

After the blank is punched and fashioned as described, the tongues D are bent upward as indicated in Figure 4 forming a rounded bend K between the same and the flange B. The portions E are also bent to extend radially outward but the tongues are left at such an angle that the rolls L can be slipped in between the same to engage with the apertures I in the flange B. After all of the rolls are so placed, the tongues D are pressed radially outward until the ends of the portions E contact with the flange B. The parts are so proportioned that in this position the tongues D will retain the rolls from radial outward movement. The rolls are given sufficient freedom to revolve without friction and the relative positions of the tongues and flange B is accurately determined by the portions E which form in effect spacers.

A bearing constructed as above described will hold the rolls in accurately spaced relation and as the cage is formed from an integral blank there are no parts to become loosened or misplaced during service. Furthermore, a minimum amount of metal is used in forming the blank, the outside diameter of which is only that required for forming the annular conical flange B while the tongues B and spacers E are formed from the center portion which would otherwise be wasted. As the whole construction is formed by dies it is highly accurate while the method of introducing the rolls is one which greatly simplifies assembly.

What I claim as my invention is:

1. In a roller bearing, the combination with a series of rolls having their axes converging to a common point, of a cage or retainer for said rolls comprising a conical annular flange having spaced apertures therein of a width slightly less than the diameter of the roll, integral tongues extending upward from the small diameter end of said flange between said rolls and radially outwardly bent portions at the ends of said tongues contacting with said flange and constituting spacers for holding the edges of said tongues in proximity to the intermediate rolls when the latter are engaged with the edges of said aperture in the flange.

2. The method of forming a roller bearing cage consisting in cupping a sheet metal blank to form a flat bottom portion and a flaring annular flange, forming a series of apertures in said flange to constitute roll receiving pockets, cutting away the central bottom portion to form a series of radially inwardly extending tongues intermediate the apertures in said flange, bending said tongues upward to receive the rolls between the same and said flange and further bending said tongues to contact the ends thereof with said flange with their side edges in proximity to the rolls when the latter are located in said apertures in the flange.

3. The method of forming roller bearing cages which consists in cupping a sheet metal blank to form a flat bottom portion and a flaring annular flange, forming a series of apertures in said flange to constitute roll receiving pockets, cutting away said flat bottom portion to form a series of radially inwardly extending tongues intermediate the apertures in said flange, bending said tongues upward and with the upper end portions thereof extending outward, leaving space for the reception of rolls between said tongues and the outer flange, and finally further bending said tongues to contact said upper end portions with said flange, and to space the body portion of said tongues from said flange so that the edges thereof are in proximity to the rolls when the latter are located in said pockets.

In testimony whereof I affix my signature.

NICHOLAS J. NOLAN.